United States Patent [19]

Solomon

[11] Patent Number: 4,492,170
[45] Date of Patent: Jan. 8, 1985

[54] LOCKING MECHANISM FOR VERTICALLY ADJUSTABLE TABLE

[75] Inventor: Robert A. Solomon, Kalamazoo, Mich.

[73] Assignee: Am Fab, Inc., Kalamazoo, Mich.

[21] Appl. No.: 400,193

[22] Filed: Jul. 20, 1982

[51] Int. Cl.³ .............................................. A47B 9/00
[52] U.S. Cl. .................................... 108/148; 108/146
[58] Field of Search ...................... 403/104, 110, 109; 292/257; 108/148, 146, 144

[56] References Cited

U.S. PATENT DOCUMENTS

| 131,299 | 9/1872 | Polley | 403/110 |
|---|---|---|---|
| 153,014 | 7/1874 | Ramsever | 108/148 |
| 1,639,870 | 8/1927 | Valsvig | 292/257 |
| 2,294,967 | 9/1942 | Eberhardt | 403/110 |
| 2,685,487 | 8/1954 | Woller | 108/146 |

FOREIGN PATENT DOCUMENTS

| 1217145 | 5/1966 | Fed. Rep. of Germany | 403/110 |
|---|---|---|---|
| 188292 | 3/1964 | Switzerland | 403/110 |

Primary Examiner—James T. McCall
Attorney, Agent, or Firm—Flynn, Thiel, Boutell & Tanis

[57] ABSTRACT

A vertically adjustable table includes a base having an upright rectangular tube, a square post slidably received within the tube, and a table top supported at the upper end of the post. The post slidably engages one of the narrow walls of the tube and a horizontal slot is provided near the top of the opposite narrow wall thereof. An integral locking member made from a bent metal plate is generally U-shaped, has a bight located near the upper end of the second wall of the tube and has two legs which diverge downwardly. One leg extends into a space between the tube and post, has a semicylindrical inward bend near the lower end thereof which is of a diameter slightly greater than the space between the post and tube, and has an elongate tab at the outer end thereof which is loosely received in the slot in the tube. Limited pivotal movement of the locking member is possible about a horizontal axis defined by the cooperating tab and slot, a cam surface in the region of the semicylindrical bend being thereby moved into and out of engagement with the post. A spring urges the locking member to pivot in a direction moving the cam surface into engagement with the post.

10 Claims, 7 Drawing Figures

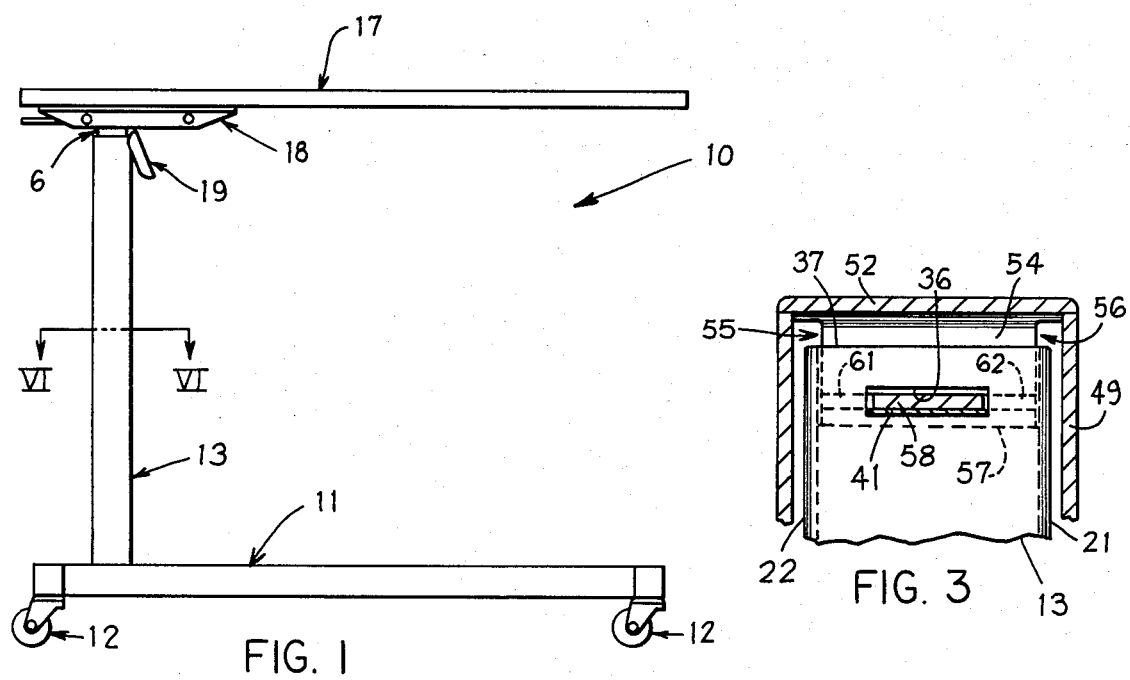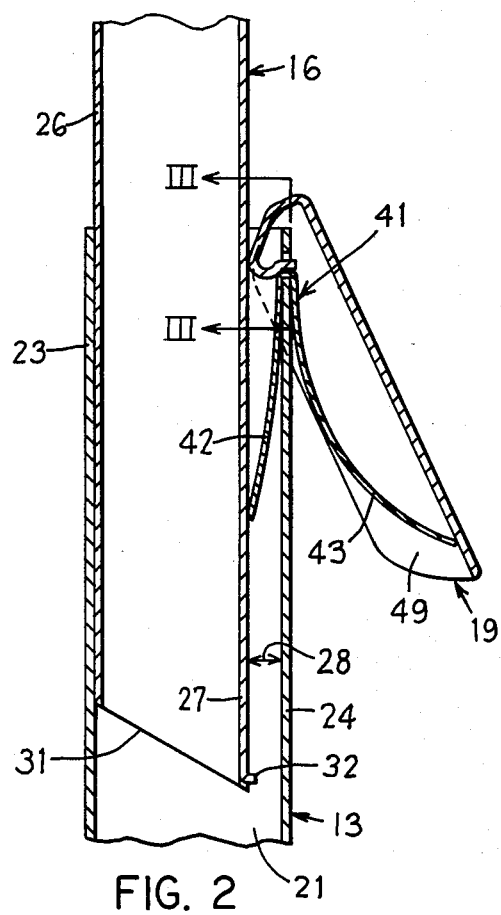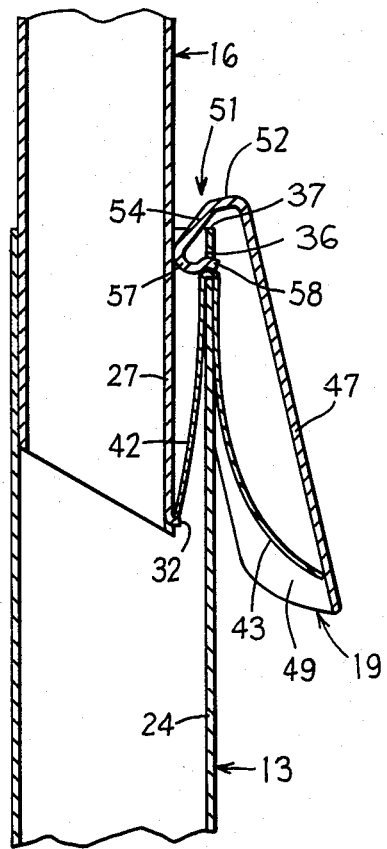

4,492,170

LOCKING MECHANISM FOR VERTICALLY ADJUSTABLE TABLE

FIELD OF THE INVENTION

This invention relates to a vertically adjustable table and, more particularly, to a mechanism for releasably locking an overbed table top in a selected vertical position.

BACKGROUND OF THE INVENTION

Tables having tops which are vertically adjustable have proved useful in many applications, particularly for overbed tables utilized in hospitals and similar situations where it is desirable to have a table which may be adjusted for use by a person in a bed or a chair.

An important part of a vertically adjustable table is the mechanism which releasably locks the table top at a selected vertical position, as this mechanism must dependably prevent unintended downward movement of the table top relative to the base. Various types of locking mechanisms have previously been developed, for example those disclosed in U.S. Pat. Nos. 2,685,487, 3,715,997 and 3,999,492. Although these mechanisms have generally been adequate for retaining the table top at selected vertical positions, they have not been satisfactory in all respects. In particular, they have required a relatively large number of parts and the necessary assembly of such parts, and/or have involved relatively complex machining of certain parts. Accordingly, the tables utilizing these locking mechanisms have been relatively expensive to manufacture and assemble.

Accordingly, it is an object of the present invention to provide a locking mechanism for a vertically adjustable table which is simple and utilizes a minimum number of structural parts, and which is therefore inexpensive to manufacture and assemble.

A further object of the present invention is to provide a locking mechanism, as aforesaid, which will securely and dependably retain the table top in a selected vertical position.

A further object of the present invention is to provide a locking mechanism, as aforesaid, which is durable, is small in size and weight, and requires little or no maintenance.

SUMMARY OF THE INVENTION

The objects and purposes of the invention, including those set forth above, are met by providing a vertically adjustable table which includes an upright tube and an upright post which is telescopically slidably received within the tube, one of the post and tube being supported on a base, and the other having a table top supported at the upper end thereof. A first wall portion of the post slidably engages a first wall portion of the tube, and respective second wall portions of the tube and post on sides thereof opposite the first wall portions are spaced from each other, the second wall portion of the tube having an opening therethrough near an end thereof. A locking member has a tab thereon which is loosely received in the opening so that the locking member is pivotal about a generally horizontal axis defined by the cooperating tab and opening. A cam surface provided on the locking member is movable into and out of engagement with the second wall portion of the post in response to pivotal movement of the locking member. The locking member has a manually graspable portion which extends out of the space between the post and tube past the outer end of the tube. A resilient arrangement is provided for yieldably urging the locking member to pivot relative to the tube in a first direction which corresponds to movement of the eccentric surfaces into engagement with the second wall portion of the post.

The locking member is preferably an elongate bent plate having the tab at one end thereof and shoulders on laterally opposite sides of the tab which engage the inner surface of the second wall portion of the tube. The plate extends from the tab toward the post, has adjacent the post an arcuate bend toward the end of the tube, and extends outwardly past the end of the tube, the cam surface being provided in the region of the arcuate bend. The elongate plate is bent back on itself beyond the end of the tube and then extends approximately along the tube toward the one of the base and table top connected to the tube.

In the preferred embodiment, the opening in the tube is a horizontal slot, and the tab is horizontally elongated. The resilient arrangement includes a V-shaped leaf spring which extends through the slot on the side of the tab remote from the free end of the tube, one leg thereof being disposed in the space between the tube and post and the other leg thereof being outside the tube. The legs of the spring extend away from the free end of the tube on opposite sides of and initially parallel to the second wall portion of the tube and then flare outwardly. The end of the leg disposed between the post and tube is slidably disposed against the post, and the end of the other leg of the spring is disposed against the manually graspable portion of the locking member and urges it away from the tube.

BRIEF DESCRIPTION OF THE DRAWINGS

The invention will be described in greater detail hereinafter in connection with the accompanying drawings, in which:

FIG. 1 is a side elevational view of a vertically adjustable bedside table embodying the present invention;

FIG. 2 is a fragmentary sectional view of the locking mechanism of the table of FIG. 1;

FIG. 3 is a sectional view taken along the line III—III of FIG. 2;

FIG. 4 is a sectional view similar to FIG. 2 showing the locking mechanism in a different position of operation;

Figure 5:
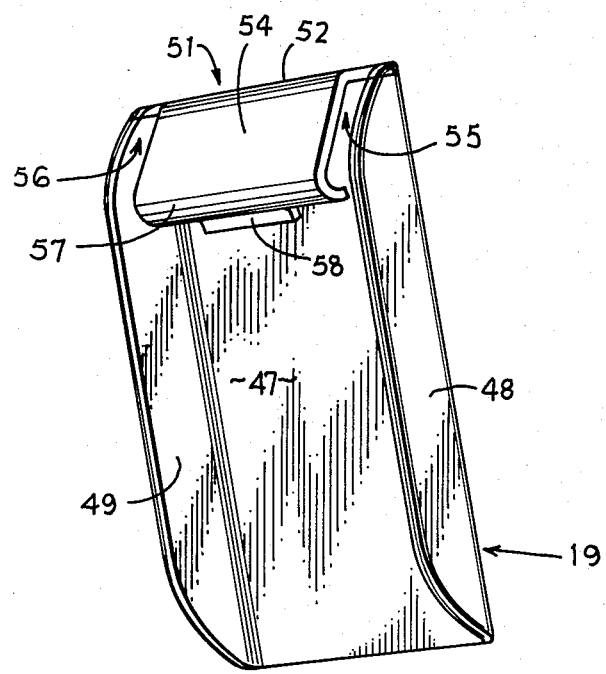
FIG. 5 is a perspective view of a handle which is a component of the locking mechanism of the table of FIG. 1.

Certain terminology will be used in the following description for convenience in reference only and will not be limiting. The words "up" and "down" will designate directions in the drawings to which reference is made. The words "in" and "out" will respectively refer to directions toward and away from the geometric center of the table and designated parts thereof. Such terminology will include the words specifically mentioned, derivatives thereof and words of similar import.

DETAILED DESCRIPTION

Referring to FIG. 1, an overbed table 10 includes a conventional base 11 supported on casters 12 and having an upright rectangular tube 13 secured thereon, a square post 16 telescopically slidably received within the tube 13 and having a table top 17 supported thereon by a mechanism 18, and having a release mechanism which is actuated by a manually operable handle or lever 19 and is described in greater detail hereinafter.

The support mechanism 18 is conventional and therefore not described in detail. It preferably is adapted to permit pivotal movement of the table top 17 relative to the post 16 and to releasably lock the table top 17 in a selected pivotal position with respect to the post 16. However, it could alternatively be of a type which rigidly secures the table top 17 to the post 16.

Figure 6:
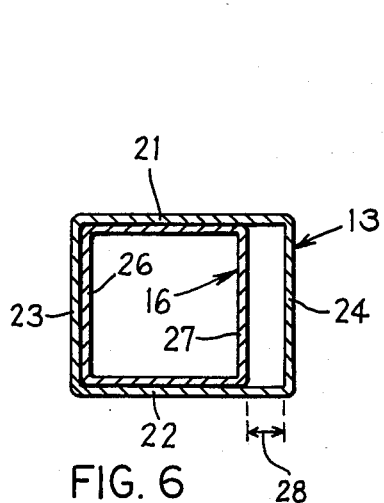
FIG. 6 is a sectional view taken along the line VI—VI of FIG. 1.

As illustrated in FIG. 2, the post 16 is hollow in the preferred embodiment in order to minimize the weight of the table 10. Referring to FIG. 6, the inside dimension between the lateral walls 21 and 22 of the tube 13 is only slightly greater than the corresponding outside dimension of the post 16, so that the post 16 can slide within the tube 13 but lateral movement of the post 16 is substantially prevented. The inside dimension between the remaining walls 23 and 24 of the tube 13 is somewhat greater than the outside dimension of the walls 26 and 27 of the post 16, and the wall 26 of the post 16 slidingly engages the wall 23 of the tube 13. Thus, the respective walls 27 and 24 of the post 16 and tube 13 are spaced by a distance designated in FIG. 6 by the reference numeral 28.

As shown in FIG. 2, the lower end 31 of the post 16 is cut at an angle with respect to a horizontal reference, the lower edge of the wall 26 thus being higher than the lower edge of wall 27. The lower edge of the wall 27 of the post 15 is bent toward the tube wall 24 to form an outwardly projecting lug 32.

An elongate horizontal slot 36 (FIGS. 3 and 4) is provided in the wall 24 of the tube 13 near the top edge 37 thereof. As shown in FIG. 3, the width of the slot 36 is somewhat less than the distance between the walls 21 and 22 of the tube 13, each end of the slot 36 being spaced from the nearest one of the walls 21 and 22.

As shown in FIG. 2, a leaf spring 41 of inverted V-shape extends through the slot 36 and has two legs 42 and 43 which extend downwardly from the slot 36, the leg 42 being disposed in the space 28 between the walls 27 and 24 of the post 16 and tube 13, respectively, and the leg 43 being disposed outside of the tube 13. The legs 42 and 43 initially extend substantially parallel to the wall 24 of the tube 13 and then flare outwardly away from such wall. The leg 43 is somewhat longer than the leg 42 and has a slightly greater curvature in the region where it flares outwardly. The lower end of the leg 42 is slidingly disposed against the wall 27 of the post 16, and the lower end of the leg 43 is slidingly disposed against an inner surface of the handle 19.

In the preferred embodiment, the handle 19 is an integral unit which is made by bending a single metal plate of appropriate shape. More specifically, referring to FIGS. 3 to 5, the handle 19 includes a generally planar main wall portion 47 and two side walls 48 and 49 which extend away from the lateral edges of the main wall 47 at substantially a right angle thereto. The spacing between the inner surfaces of the side walls 48 and 49 is slightly greater than the distance between the walls 21 and 22 of the tube 13.

The upper end 51 of the handle 19 is bent back on itself and includes a planar end wall portion 52 which has the same lateral width as the main wall 47, extends between the side walls 48 and 49, and is substantially perpendicular to the main wall 47 and side walls 48 and 49. The wall 52 extends away from the main wall 47 a distance approximately equal to the spacing 28 between the walls 27 and 24 of the post 16 and tube 13, respectively. A planar wall portion 54 extends downwardly and outwardly from the outer end of the wall 52 a distance approximately 1.5 times the spacing 28 between the walls 27 and 24 at an angle of approximately 45° with respect to the plane of the main wall 47, and has a lateral width which is less than the distance between the inside surfaces of the walls 21 and 22 of the tube 13, so that spaces 55 and 56 exist between the respective lateral edges of the wall 54 and the associated side walls 48 and 49.

An approximately semicylindrical wall portion 57 is provided at the outer end of and has a lateral width substantially equal to that of the wall portion 54. The diameter of the wall portion 57 is slightly greater than the spacing 28 between the walls 27 and 24 of post 16 and tube 13, respectively. The wall portion 54 is substantially tangential to the semicylindrical wall portion 57. A short tab 58 having a lateral width slightly less than the length of the slot 36 is provided at the end of the wall 57 and extends at an angle of approximately 60° with respect to the plane of the main wall 47. The edges of the wall 57 adjacent and on opposite sides of the tab 58 serve as shoulders 61 and 62.

Described in a slightly different manner, the handle 19 is a generally U-shaped plate which includes a bight defined by end wall 52 disposed adjacent the end 37 of the tube wall 24 and two legs which diverge away from the bight 52 at an angle of approximately 45° to each other, one leg being defined by the wall portion 47. The other leg is defined by the wall portions 54 and 57, and thus extends into the space 28 between the post 16 and tube 13 and has an arcuate inward bend adjacent the wall 27 of the post 16, the tab 58 being provided at the end of such leg.

As shown in FIGS. 2 and 3, the tab 58 is received somewhat loosely in the slot 36 above the spring 41, the shoulders 61 and 62 bearing against the inner surface of the wall 24 of the tube 13 on opposite sides of the slot 36. The wall portion 57 extends from the tab 58 to a point adjacent the wall 27 of the post 16, and the wall portions 54 and 52 extend from such location upwardly and over the top 37 of the wall 24 of the tube 13, and the main wall 47 then extends downwardly and outwardly with respect to the wall 24 of the tube 13. As shown in FIG. 3, the upper ends of the side walls 21 and 22 of the tube 13 are respectively received in the spaces 56 and 55 between the side walls 48 and 49 and the wall portion 54 of the handle 19.

Since the tab 58 is somewhat loosely received in the slot 36, the handle 19 is movable in a generally pivotal manner, the axis of such movement being horizontal, generally lying in the plane of wall 24, and approximately coincident with the longitudinal axis of the horizontal slot 36. The leg 43 of the spring 41 firmly and continuously urges the handle 19 to pivot counterclockwise in FIG. 2, and the leg 42 thereof, which engages the wall 27 of the post 16, provides positional stability to the spring 41.

The locking mechanism is assembled in the following manner. First, the leg 42 of the leaf spring 41 is inserted into the slot 36 in the tube 13, and the spring is then positioned so that its vertex is disposed in the slot 36 and its legs 42 and 43 extend downwardly into the tube 13. The wall portions 54 and 57 of the handle 19 are then lowered into the tube 13 with the handle 19 oriented substantially as shown in FIG. 2, and the handle 19 is then moved laterally to move the tab 58 thereon into the slot 36 above the spring 41. It will thus be recognized that only a single opening in the tube 13 is required to support the spring 41 and handle 19, as the spring 41 and tab 58 are both received in and take up a majority of the space in the slot 36. Thereafter, the handle 19 is manually held in the position of FIG. 4 and the post 16 is inserted downwardly into the tube 13. The angled lower end 31 of the post 16 facilitates insertion of the post 16 into the tube 13, as it permits the lug 32 to be inserted past the surfaces 54 and 57 of the handle 19 before the full width of the post 16 enters the tube 13, and also guides the lower end of the wall 26 of the post 16 into the tube 13.

A counterbalancing mechanism for the table top 17 is not essential to the present invention and is therefore not illustrated and described. If desired, however, a conventional counterbalancing mechanism could be provided, for example one similar to that disclosed in U.S. Pat. No. 3,715,997. Also, the locking mechanism could be reversed so that the handle 19 is on the opposite side of the post 16, thereby preventing inadvertent release of the locking mechanism due to engagement of the handle with a bed or a limb of the person using the table. Moreover, the handle 19 could be an integral part made in a different manner, for example by casting.

It is readily apparent that this inventive locking mechanism requires the provision of only one small slot in the tube 13, a simple V-shaped leaf spring, and a one-piece handle made by bending a stamping from a metal plate. It can be assembled in a matter of seconds and does not require the use of any bolts or other fasteners.

Figure 7:
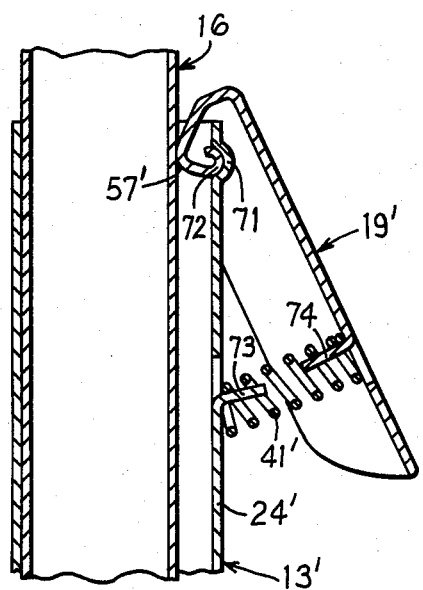
FIG. 7 is a fragmentary sectional side view similar to FIG. 2 of an alternative embodiment of the locking mechanism illustrated in FIG. 2.

FIG. 7 illustrates an alternative embodiment of the inventive locking mechanism. This embodiment includes a tube 13' which differs from the tube 13 of the embodiment of FIG. 1 in that, instead of a horizontal slot, a horizontally extending, semi-cylindrical depression 71 is provided in the inner surface of the wall 24' near the upper end thereof. The handle 19' is substantially identical to the handle 19 of the embodiment of FIG. 1, except that no tab 58 is provided at the end thereof which is disposed in the tube. Instead, a further arcuate bend 72 is provided at this end of the handle 19'. The diameter of the arcuate bend 72 is approximately equal to the diameter of and is slidably received in the semi-cylindrical depression 71, thereby effecting the pivotal support of the handle 19' with respect to the tube 13'. Alternatively, in place of the arcuate bend 72, a section of a cylindrical rod could be welded to the end of the handle 19'. A helical compression spring 41' extends between the tube wall 24' and the handle 19' and urges the handle 19' pivotally in a counterclockwise direction in FIG. 7. The ends of the spring 41' can be supported on the tube 13' and handle 19' in any convenient manner, for example by means of respective tabs 73 and 74 which are integral with the tube 13' and handle 19' and bent to the illustrated positions. In other respects, the embodiment of FIG. 7 is identical to the embodiments of FIGS. 1 to 6.

OPERATION

The locking mechanism of the table 10 of FIG. 1 is operated in the following manner.

When the handle 19 is not manually actuated, the leg 43 of the spring 41 urges it counterclockwise to the position illustrated in FIG. 2, in which position the outer surface of the wall portions 54 and 57 of the handle 19 is firmly urged against the wall 27 of the post 16. The post 16 is thus firmly frictionally gripped between the wall 23 of the tube 13 and the surface of the wall portions 54 and 57 of the handle 19. Downward forces exerted by the table top 17 and items placed thereon tend to cause the handle 19, due to its frictional engagement with the post 16, to pivot even further counterclockwise, thereby frictionally locking the post 16 even more tightly against downward movement relative to the tube 13. In effect, the end 51 of the handle 19 serves as a locking member, the wall portions 54 and 57 thereof defining a cam surface which is eccentrically pivotal about an axis substantially coincident with the longitudinal axis of the slot 36. The lower end of the post 16 is maintained against the wall 23 of the tube 13 by the weight distribution of the cantilevered table top. If desired, however, the lug 32 on the post 16 could extend to a location adjacent the wall 24 of the tube 13 to prevent movement of the bottom of the post 16 away from the wall 23 of the tube 13. This would be particularly important when used in a table which is not a bedside table and does not have a cantilevered top.

When it is necessary to adjust the vertical position of the table top 17, the handle 19 is manually pivoted toward the tube 13 against the urging of the spring 41 to the position illustrated in FIG. 4, thereby moving the cam surface of the wall portions 54 and 57 of the handle 19 out of frictional engagement with the wall 27 of the post 16. The post 16 can then be moved upwardly or downwardly relative to the tube 13. The spring leg 42 does not exert a force onto the post 16 sufficient to inhibit relative movement of the post 16 and tube 13. Upward movement of the post 16 relative to the tube 13 is limited by engagement of the lower end of the spring 42 with the lug 32 provided at the lower end of the wall 27 of the post 16. Once the table top 17 has been moved to a desired vertical position, the handle 19 is released and will automatically return under the urging of the spring 41 to the position illustrated in FIG. 2, thereby again frictionally locking the post 16 against movement relative to the tube 13.

The embodiment of FIG. 7 operates in a manner substantially identical to the embodiment of FIG. 1, and such operation is therefore not described in detail.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vertically adjustable table, including an upright tube and an upright post telescopically slidably received within said tube, one of said tube and post being supported on a base and the other of said tube and post having a table top supported at the upper end thereof, and including locking means cooperable with said tube and post for releasably securing them against relative movement, the improvement comprising wherein a first wall portion of said post slidably engages a first wall portion of said tube and respective second wall portions of said tube and post on sides thereof opposite said first wall portions are spaced from each other, said second wall portion of said tube having means for receiving a tab near an end thereof, said locking means including a single piece locking member having a tab thereon received in said tab receiving means so that said locking member is thereby rendered pivotal about a generally horizontal axis lying generally in the plane of said second wall portion of said tube, having a cam surface thereon directly intermediate said tab receiving means and said second wall portion of said post and being movable into and out of engagement with said second wall portion of said post in response to said pivotal movement of said locking member, and having a manually graspable portion extending out of said space between said post and tube past said end of said tube, and including resilent means for yieldably urging pivotal movement of said locking member relative to said tube in a first direction which corresponds to movement of said cam surface into engagement with said second wall portion of said post.

2. The table according to claim 1, wherein said tab receiving means includes an opening through said second wall portion of said tube, said tab being loosely received in said opening, and wherein said locking member is an elongate bent plate having said tab at one end thereof and having shoulders on laterally opposite sides of said tab which engage the inner surface of said second wall portion of said tube, said plate extending from said tab toward said post, having adjacent said post an arcuate bend toward said end of said tube, and extending past said end of said tube, said cam surface being provided in the region of said arcuate bend and said manually graspable portion being provided at said end of said locking member remote from said tab.

3. The table according to claim 2, wherein said elongate plate is bent back on itself beyond said end of said tube and then extends approximately toward the one of said base and table top connected to said tube.

4. The table according to claim 3, wherein said opening in said tube is a horizontal slot and said tab is horizontally elongated, and wherein said resilient means includes a V-shaped leaf spring which extends through said slot on the side of said tab remote from said free end of said tube, one leg thereof being in said space between said tube and post and the other leg thereof being outside said tube, the legs of said spring extending away from said free end of said tube on opposite sides of and initially parallel to said second wall portion of said tube and the end portions of said legs flaring outwardly away from said second wall portion of said tube, the end of said one leg of said spring being slidably disposed against said post and the end of said other leg of said spring being disposed against said manually graspable portion of said locking member and urging it away from said tube.

5. The table according to claim 4, including a lug provided at the end of said second wall portion of said post and projecting toward said second wall portion of said tube, engagement of said lug with the end of said one leg of said spring limiting movement of said post relative to said tube in a first direction.

6. The table according to claim 1, wherein said locking member is a U-shaped bent plate having a bight and two legs which diverge away from said bight, said bight being disposed in the region of said end of said second wall portion of said tube, one said leg extending into said space between said second wall portions of said tube and post, having an inward arcuate bend near the lower end thereof and adjacent said post, having said tab at the free end thereof and having means defining shoulders on opposite sides of said tab which engage the inner surface of said second wall portion of said tube, and said other leg being substantially longer than said one leg and extending approximately toward the one of said base and table top connected to said tube, said cam surface being provided on said one leg in the region of said arcuate bend.

7. The table according to claim 6, wherein said bight is substantially perpendicular to said other leg of said lockihg member and said legs of said locking member diverge at an angle of approximately 45°, said arcuate bend being substantially semicylindrical and having a diameter slightly greater than the distance between said second wall portions of said tube and post.

8. The table according to claim 7, wherein said tab receiving means includes an opening through said second wall portion of said tube, said tab being loosely received in said opening, wherein said tube is rectangular, said first and second wall portions thereof being respective shorter sides thereof, wherein said opening in said second wall portion is a horizontal slot having a length less than the width of said second wall portion, said one leg of said locking member has a width greater than the length of said slot but less than width of said second wall portion, and the length of said tab is slightly less than the length of said slot, and wherein said bight and said other leg of said locking member are slightly wider than said second wall portion, said locking member including side walls extending on opposite sides of said tube substantially normal to and from opposite lateral edges of said other leg of said locking member.

9. The table according to claim 6, wherein said tab receiving means includes a generally semi-cylindrical depression in the inner surface of said second wall portion of said tube, and wherein said tab has a generally cylindrical surface thereon slidably engaging the surface of said depression.

10. The table according to claim 6, wherein said tab receiving means includes an opening through said second wall portion of said tube, said tab being loosely received in said opening.

* * * * *